July 5, 1927.
V. H. JACKSON
DRAWBAR REVERSE LOCK
Filed Sept. 29, 1925
1,634,501
3 Sheets-Sheet 1
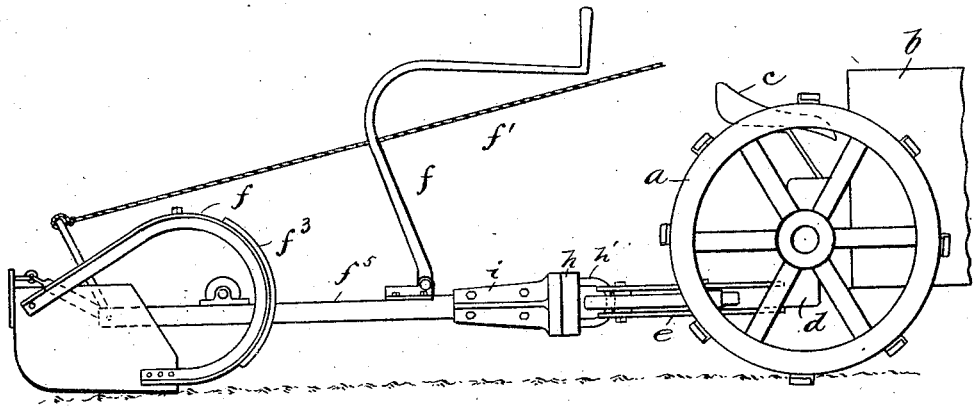
Fig. 1
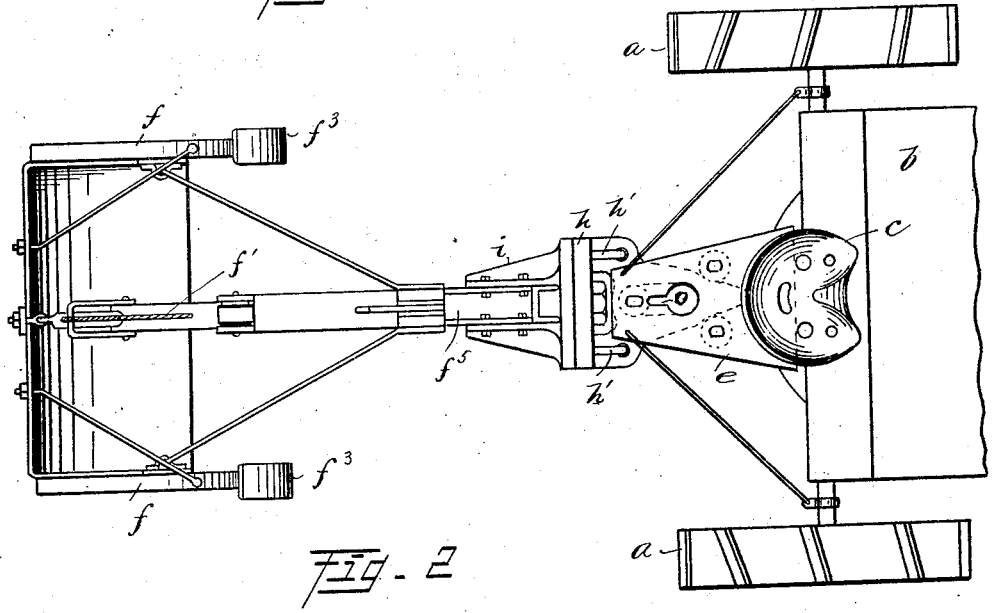
Fig. 2
Inventor
Vilas H. Jackson
Attorney.

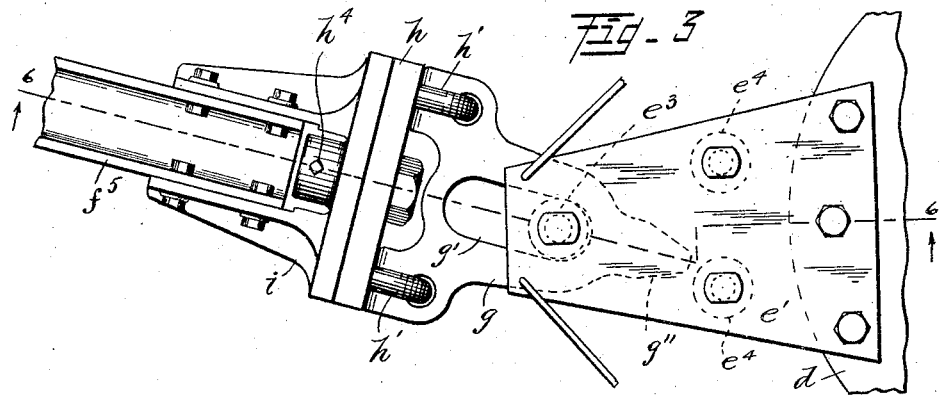
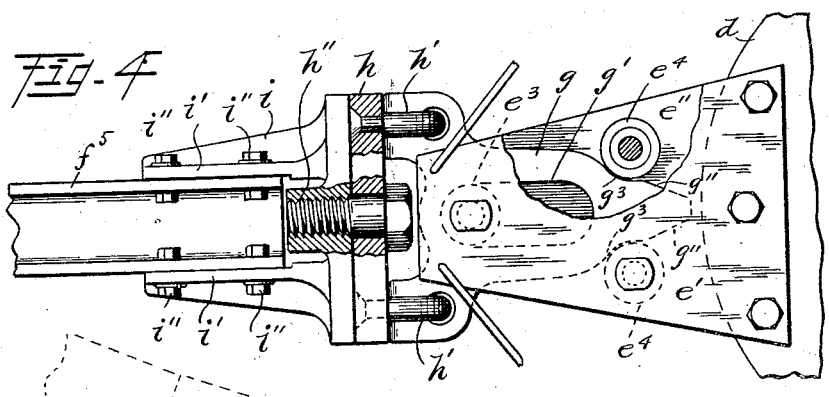
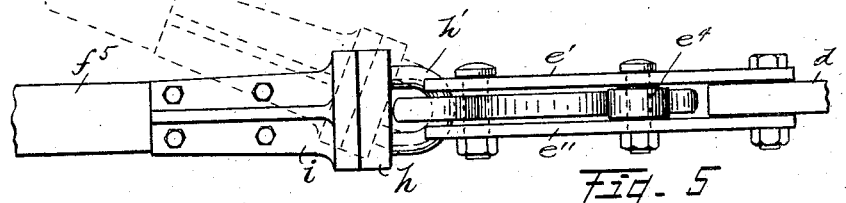
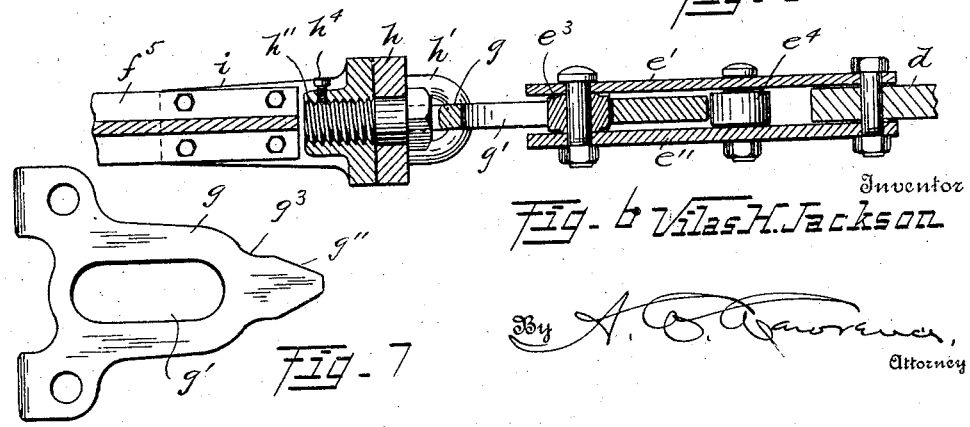

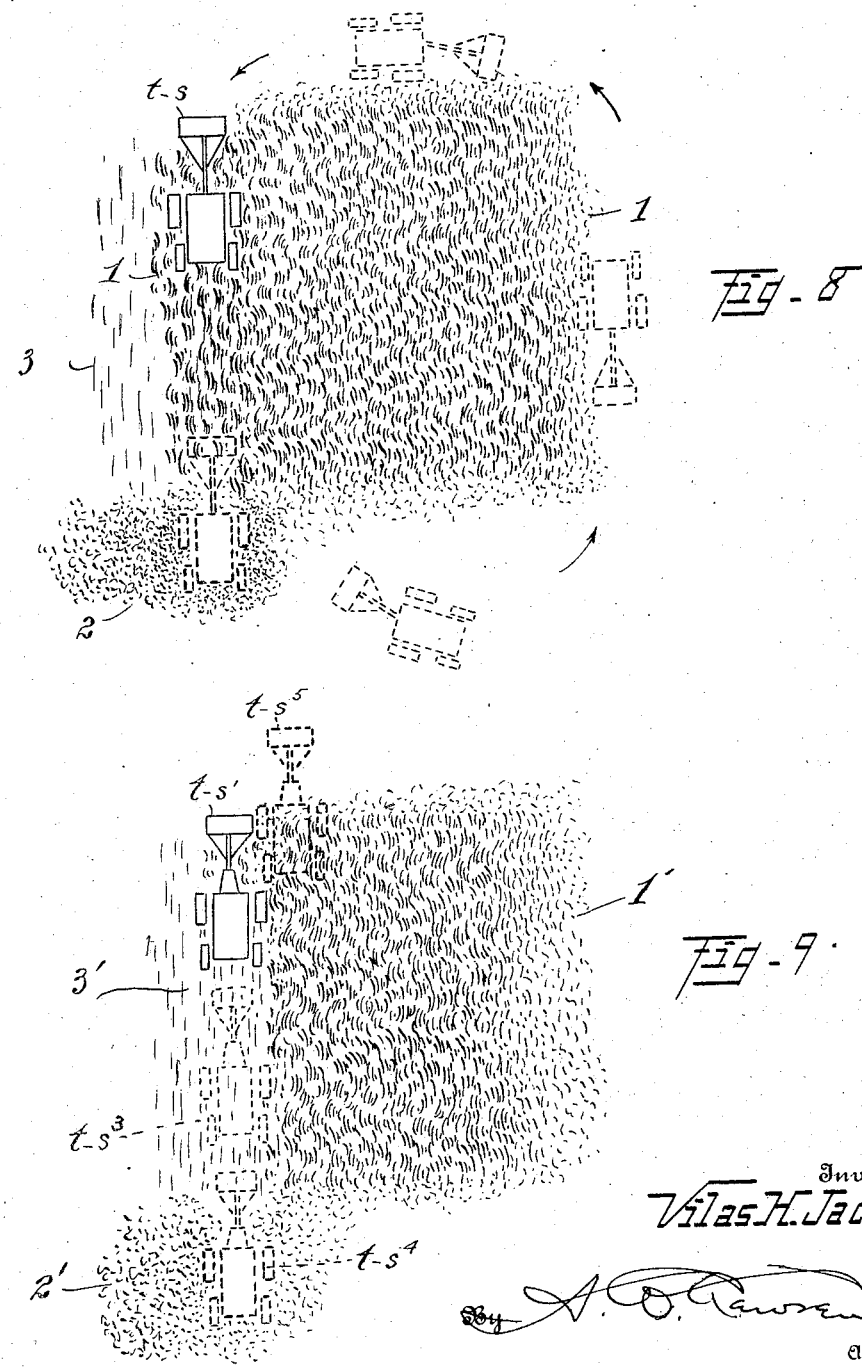

Patented July 5, 1927.

1,634,501

UNITED STATES PATENT OFFICE.

VILAS H. JACKSON, OF CLEVELAND, OHIO, ASSIGNOR, BY MESNE ASSIGNMENTS, TO THE GUSTAV SCHAEFER WAGON COMPANY, OF CLEVELAND, OHIO, A CORPORATION OF OHIO.

DRAWBAR REVERSE LOCK.

Application filed September 29, 1925. Serial No. 59,315.

My invention relates to improvements in a drawbar reverse-lock and to a novel method of operating scrapers obtainable with the use thereof. The object of my invention is first to provide means for rigidly connecting a prime mover with its follower member in reversing or backing them as a unit, and second, to excavate or grade in an improved and more expeditious manner so that the loosened earth need not be traversed by the prime mover or tractor.

My present invention will be explained in connection with the coupling of a power tractor and a scraper, although it will be obvious that any other follower, such as a trailer, plow, mower or binder may be connected thereby for traction, as required.

Numerous appliances of the prior art have been provided for tractively connecting prime movers and followers, although very few of these have provided in any way for a reverse movement and none, to my knowledge, has provided for the rigid locking of the prime mover and trailer in backing them as a unit.

The device of my invention may be briefly described as comprising connective means, including a freely pivoted link member which permits the usual angular tractive relation of the connected members in turning curves or corners. Associated with said link, there are provided locking means which are automatically brought into operation for effecting the centering or alinement of the connecting link with the prime mover and locking it rigidly in alinement therewith, when the backing movement is continued. As an adjunct thereto, I preferably provide a universal connection between the prime mover and the follower member so as to compensate for any inequalities in the ground traversed thereby.

The details and functions of these members, together with my improved method of operation may best be explained in connection with the accompanying drawings, wherein:

Figure 1 is a view in side elevation, partially broken away and somewhat diagrammatic in character, illustrating my improved drawbar reverse-lock as operatively associated with a power tractor and a Fresno scraper.

Fig. 2 is a plan view of the same.

Fig. 3 is an enlarged detail of my improved drawbar reverse-lock, also shown in plan view with the members in angular tractive relation.

Fig. 4 is another plan view of my drawbar reverse-lock, but partially broken away and in section, showing the members thereof in locking relation.

Fig. 5 is a side elevation thereof, suggesting by dotted lines the angular compensation afforded by the universal coupling.

Fig. 6 is an irregular longitudinal section on line 6—6, Fig. 3.

Fig. 7 is a plan view of the composite link employed in my device.

Fig. 8 is a diagrammatic view, indicating the present or common method of excavating by employing tractor-scraper units, and Fig. 9 is a similar view indicating an improved method attainable by using the drawbar reverse-lock of my invention.

Throughout the several figures of the drawings, I have employed the same character of reference to indicate similar parts.

Although I do not wish to be understood as limiting my invention thereto, I have shown and will describe this improvement in connection with a tractor connected for the actuation of a scraper and the novel method of grading or excavating therewith.

At the right of Fig. 1, I have somewhat diagrammatically shown the rear portion of a tractor, of which the wheels $a$, body $b$, and seat $c$ will readily be recognized. Attached to the drawbar $d$ of said tractor, is my improved drawbar reverse-lock generally designated by reference character $e$ connecting the scraper operatively to the tractor. This scraper is provided with a dumping lever $f$, an actuating lever $f'$ and curved supporting skids $f^3$ of well known construction not necessary to be described in detail.

Referring more particularly to Sheet 2 of the drawings, I may now explain the structural features of my improved reverse-lock. The upper and lower frame plates $e'$ $e''$ thereof, are attached directly to the drawbar $d$ of any prime mover, between which the link-member $g$ is pivotally mounted upon the roller $e^3$, which bears interiorly of the slot $g'$. Said link-member $g$ is forwardly narrowed to wedge-like form $g''$, with lateral recesses $g^3$ conforming to the peripheries of the paired rollers $e^4$, mounted between the frame plates $e$.

This link-member is united by means of two heavy U-shaped connectors $h'$ with the bar $h$, and the latter in turn is pivotally connected with the bifurcated casting $i$ by means of the center-bolt $h''$, which is held from turning by means of the set screw $h^4$.

These connector members, it will be seen, afford a strong and reliable type of universal joint for permitting the independent movement of the tractor and scraper while traveling over uneven ground.

Thus the drawbar $f^5$ of the scraper is connected between the limbs $i'$ of the casting $i$, between which it is secured by the bolts $i''$ in order that the scraper may be rigidly connected with and operated by the tractor, as will be later explained.

The functions of my improved reverse lock may now be set forth, preliminary to the explanation of its preferred use in grading, excavating, and the like. When power is applied to the drawbar, the parts will be extended and the link-member will slide back to its extreme rear position so that it may freely pivot about the roller $e''$ as the tractor moves forward. Any inequalities in the ground over which the tractor and scraper are advancing, will be compensated by means of the universal joint connection.

The unique function of my improved reverse lock, however, is availed of upon backing the tractor after the scraper has been dumped, or backing it to position for filling under any circumstances. The reversal of the tractor, even when the connected follower is out of line to the extent shown in Fig. 3, will serve to enter the wedge shaped portion $g''$ between the opposing rollers $e^4$ $e^4$, so that the unloaded scraper or other follower may readily be slewed into alinement with the tractor; the parts of my improved device assuming the position shown in Fig. 4.

The lateral strains are taken up by the rollers $e^3$ and $e^4$ while the recesses $g^3$ are closely embraced by the rollers $e^4$ $e^4$, affording practically no play for the link-member. That portion of said link immediately forward of the recesses $g^3$ has approximately parallel sides which, still further forward thereof, merge into the acute-angled wedge-portion $g''$, Fig. 4. Thus the rollers $e^4$ can exert no tendency to displace the inserted link-member when subjected to lateral pressure, since they bear upon the parallel sides thereof or the contours of said recesses. These associated and combined elements, however, afford the maximum advantage and moment in initially alining the tractor and scraper upon backing, inasmuch as cramping and friction are minimized by the universal-joint coupling, and by the rollers, while the particular shape of the link-member contributes to the avoidance of any possible jambing in an intermediate position.

Under these circumstances, it will be seen that the tractor-scraper unit, as I may term it, may be backed in alinement to any desired position; the scraper being forcibly swung to one side or the other, if necessary, under the impetus of the tractor, so that the scraper may be accurately positioned in any desired location for filling the same.

Reference may now be made to Sheet 3 of the drawings in order to explain some of the advantages and a novel method of operating with the tractor-scraper unit set forth as structurally exemplifying my invention. In Fig. 8 I have diagrammatically shown a plowed area 1, which is to be excavated by the tractor-scraper unit $t$—$s$. Four dotted line positions of said unit are indicated in the drawing as the unit encircles the plowed area 1 in a continuous circular path, taking a scraper full from the rear and advancing it to the spoil pile 2, where the scraper load is dumped. The area 3 at the left, may be assumed to have been scraped or excavated sufficiently. This represents common practice with the ordinary equipment and presents the objections of requiring a relatively long path of travel for the tractor-scraper unit, together with the necessity for traveling over the plowed or loosened earth after filling the scraper until the spoil-pile is reached.

In contrast to the foregoing, reference may now be made to Fig. 9, illustrating another plowed area 1' which is under process of excavation by means of the tractor-scraper unit $t$—$s'$ equipped with my improved drawbar reverse-lock. Instead of starting from the position at the rear, $t$—$s^5$, shown in dotted lines, and traversing the loosened or plowed earth in front of it, the first scraper load would be taken approximately from the forward dotted line position $t$—$s^4$ for that particular furrow and drawn forward for dumping upon the spoil-pile 2'. Said tractor-scraper unit would then be backed to another rearward position, $t$—$s^3$, for example, and its load drawn forward and dumped upon the spoil-pile; the final load being taken from the full line, $t$—$s'$, position and dumped as before. This operation of shuttling back and forth being repeated, it will be understood, throughout the entire plowed area to be excavated until the spoil-pile has been extended entirely across the front of said area to its right-hand edge and the full amount of earth has been dumped thereon. This shuttling operation is obtainable only by rigidly locking the scraper as a unit with its tractor, so that the former may be accurately backed to any desired position, and this without traversing any of the plowed ground by the tractor, since the tractor-scraper unit preferably, if not invariably, works from the front to the back of any given area that is to be excavated or graded.

Moreover, the spoil-pile is normally traversed twice by the tractor and thereby it is pressed down and rolled into a relatively compact mass of earth, which is a particularly desirable feature in the event that embankments or levees are under construction.

On the other hand, in the event that a hole is to be filled or an excavation is to be refilled, for example, the tractor-scraper unit may be initially filled from the spoil-pile or other source of material, then backed to the rearmost position and dumped, and shuttled forward and backward, reversing the above described operation, as just explained in connection with the diagram, Fig. 9. However, it is not necessary for me further to expand upon the possibilities and widened uses of a prime mover when connected with a suitable follower, such as any suitable type of scraper, plow, or other trailer advantageously operated by rigidly locking it in alinement with the tractor.

In the practical operation of my improved automatic drawbar reverse-lock, it is found desirable, upon reversing the tractor, accurately to gauge the position of the link member in order to ascertain whether it will enter between the opposing centering members or rollers. For this purpose I have provided as a desirable modification, the keyhole opening $o$, Fig. 2, in the upper and lower plates $e$ of the frame or casing. The operative, by glancing back, may observe whether the link is too much out of alinement for it to enter between the rollers, $e^4$ $e^4$, and govern his control of the tractor accordingly. This keyhole opening, moreover, affords a ready means for attaching a chain drag merely by securing the links of the chain in the narrow portion of said opening, wherein the chain will be securely held.

Having now described the preferred embodiment of my invention and its novel and advantageous mode of operation, I claim as new and desire to secure by Letters Patent, the following:

1. The combination with a prime mover and a follower, of a separate tractive-member connected rigidly with each and flexibly with each other, and means for rigidly locking said tractive-members in a horizontal plane upon the reverse movement of the prime mover, substantially as set forth.

2. The combination with a prime mover and a follower, of separate tractive-members respectively connected rigidly with each, a universal tractive-connection between said members, and means for rigidly locking the tractive-members in a horizontal plane upon the reverse movement of the prime mover, substantially as set forth.

3. In an appliance of the class described, the combination with a frame or casing, of two spaced opposing centering members, a wedge-shaped link pivotally mounted in the casing normally to swing free of said members, and means including a universal connection for insuring the entry of the end of the link between said centering members upon the telescoping action of the parts, substantially as set forth.

4. In an appliance of the class described, the combination with a mounting frame, of two spaced opposing rollers therein, a longitudinally slotted wedge-shaped link, a pivotal roller therefor positioned within a slot in said link whereon the same is slidably mounted to enter between said opposing rollers; said frame and link being adapted respectively to connect a prime mover and a follower tractively and rigidly lock them upon a reverse movement of the prime mover, substantially as set forth.

5. The combination with a tractor, of a scraper, pivoted tractive-members respectively connected rigidly with each, a universal tractive-connection interposed between said tractor and scraper and a drawbar reverse-lock associated with said members, comprising two spaced opposing rollers positioned to aline the tractive-members upon backing the tractor, substantially as set forth.

6. In an appliance of the class described, the combination with upper and lower mounting plates, of two spaced opposing rollers forwardly positioned therein, a longitudinally-slotted substantially wedge-shaped link having a section thereof formed with approximately parallel side walls, a rearward pivot positioned within the slot in said link whereon the same is slidably mounted to enter between the opposing rollers, whereby the parallel sides are engaged between the rollers upon the telescoping action of the parts, substantially as set forth.

7. In an appliance of the class described, the combination with spaced upper and lower mounting plates, of a longitudinally-slotted approximately wedge-shaped member, interposed between said plates, two spaced centering rollers between which the wedge-shaped link is adapted to enter, a pivotal roller positioned to engage the walls of the longitudinal slot for mounting said link, and an associated universal tractive-connection adapted to prevent binding action between the link and its engaging elements, substantially as set forth.

8. In an appliance of the class described, the combination with a frame or casing, of spaced alining members forwardly mounted therein, a slotted link member slidably mounted to enter between the alining members in its forward position, a universal tractive connection, and a rearward pivotal member in the casing permitting the free movement of said link thereon, substantially as set forth.

9. In a drawbar reverse-lock, the combination with a casing adapted to be rigidly attached to a prime mover, of an associated link member adapted to be rigidly attached to a follower with respect to a given plane, a universal tractive connection, and means provided within said casing for permitting the free pivotal movement of the link in a rearward position with respect to the casing, associated with further means for rigidly locking said link and casing in alinment upon the telescoping movement of said members, substantially as set forth.

10. In an appliance of the class described, the combination with upper and lower frame-plates, of two spaced centering rollers forwardly positioned therebetween, a wedge-shaped link pivotally mounted rearwardly of said frame-plates in position to swing free of said rollers, and means for entering the wedge-shaped end of the link between said rollers upon the telescoping action of the members, substantially as set forth.

11. In an appliance of the class described, the combination with upper and lower frame-plates, of two spaced centering rollers forwardly positioned therebetween, a longitudinally slotted wedge-shaped link adapted to enter between said rollers, and a pivotal roller rearwardly positioned between the frame-plates within the slotted link, whereon the same is slidably mounted to swing free of said rollers, whereby the link is guided to enter into locking relation between the centering rollers upon the telescoping action of the members, substantially as set forth.

In testimony whereof I do now affix my signature.

VILAS H. JACKSON.